United States Patent
Park et al.

(10) Patent No.: US 8,294,051 B2
(45) Date of Patent: Oct. 23, 2012

(54) DEVICE FOR PREVENTING WITHDRAWING AND INSERTING OF A CIRCUIT BREAKER

(75) Inventors: Woo Jin Park, Chungcheongbuk-Do (KR); Hyun Jae Kim, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 227 days.

(21) Appl. No.: 12/816,536

(22) Filed: Jun. 16, 2010

(65) Prior Publication Data

US 2010/0326799 A1    Dec. 30, 2010

(30) Foreign Application Priority Data

Jun. 25, 2009    (KR) .................. 10-2009-0057251

(51) Int. Cl.
*H01H 33/46*    (2006.01)
(52) U.S. Cl. ............... 200/50.21; 200/50.23; 200/50.24
(58) Field of Classification Search ..... 200/50.21–50.25
See application file for complete search history.

(56) References Cited

U.S. PATENT DOCUMENTS

| | | | | |
|---|---|---|---|---|
| 4,823,231 | A * | 4/1989 | Jego et al. | 361/837 |
| 5,337,210 | A * | 8/1994 | Ishikawa et al. | 361/608 |
| 6,229,106 | B1 * | 5/2001 | Robbins et al. | 200/50.21 |
| 6,490,149 | B2 * | 12/2002 | Shichida et al. | 361/605 |
| 6,689,968 | B2 * | 2/2004 | Trivette et al. | 200/50.21 |
| 6,884,949 | B2 * | 4/2005 | Yoon | 200/50.26 |
| 7,582,837 | B2 * | 9/2009 | Lyu et al. | 200/50.21 |
| 7,684,199 | B2 * | 3/2010 | Yee et al. | 361/725 |
| 2009/0014292 | A1 | 1/2009 | Lyu | |
| 2009/0015990 | A1 | 1/2009 | Kim et al. | |
| 2010/0230256 | A1 | 9/2010 | Lee et al. | |
| 2010/0230257 | A1 * | 9/2010 | Kim et al. | 200/50.25 |
| 2010/0294630 | A1 * | 11/2010 | Park et al. | 200/50.25 |

FOREIGN PATENT DOCUMENTS

| | | |
|---|---|---|
| JP | 62-152610 | 9/1987 |
| JP | 2008-131818 | 5/2008 |
| JP | 2008-104345 | 6/2008 |
| KR | 10-0505052 | 8/2005 |

OTHER PUBLICATIONS

U.S. Appl. No. 12/780,113 to Woo Jin Park et al., filed May 14, 2010.
Korea Office action, mail date is Dec. 22, 2010.
Japan Office action, mail date is Jun. 5, 2012.

* cited by examiner

*Primary Examiner* — Michael Friedhofer
(74) *Attorney, Agent, or Firm* — Greenblum & Bernstein P.L.C.

(57) ABSTRACT

Disclosed is a device for preventing withdrawing and inserting of a circuit breaker. The device for preventing withdrawing and inserting of a circuit breaker include: a lead screw is coupled between a carriage and a girder assembly and rotated by an external force to allow a breaker body to be closed or released while the carriage is moved with respect to a cradle, and a braking unit preventing the lead screw for operating when the girder assembly is released from the cradle. In an unstable state in which the girder assembly is not coupled to the cradle, a withdrawal handle is prevented from being inserted into the girder assembly. Therefore, an abnormal withdrawing operation can be prevented, and thus, various safety accidents, a contact resistance and temperature rise, damage to a device due to electrical breakdown can be prevented.

14 Claims, 8 Drawing Sheets

DEVICE FOR PREVENTING WITHDRAWING AND INSERTING OF A CIRCUIT BREAKER

The present application claims priority to Korean Application No. 10-2009-057251 filed in Korea on Jun. 25, 2009, the entire contents of which is hereby incorporated by reference in its entirety.

BACKGROUND OF THE INVENTION

1. Field of the Invention

The present invention relates to a circuit breaker and, more particularly, to a device for preventing withdrawing and inserting in a circuit breaker capable of capable of preventing a breaker body from being inserted into or withdrawn from a cradle while a circuit breaker is being closed by interworking with an opening and closing operation of the circuit breaker, to thereby secure stability of the circuit breaker and prevent damage to the circuit breaker.

2. Description of the Related Art

In general, a vacuum circuit breaker (referred to as a 'circuit breaker', hereinafter) is a protection device for automatically breaking power quickly when there is a fault in a power system as well as transmitting and receiving, switching and stopping power by using a vacuum interrupter as an arc extinguishing medium. Namely, the circuit breaker rapidly spreads and extinguishes an arc product, which is generated during an opening and closing in case of a normal load and when an accident current is broken, to quickly separate a circuit to thereby protect the circuit and the device.

The circuit breaker generally includes a cradle, a breaker main body, a carriage, and auxiliary devices. Here, the carriage includes various mechanic devices integrally coupled with the breaker main body and selectively move the breaker main body to the cradle.

In order to operate the circuit breaker, the breaker main body must be electrically connected with the cradle. Namely, the carriage must be completely moved to the cradle and respective contact points of the breaker main body integrally coupled with a front side of the carriage must be completely bound with the cradle to perform a closing operation. However, if the carriage is inserted and withdrawn while the circuit breaker is being closed, a serious safety accident would occur or the device would be damaged, so an apparatus for preventing inserting and withdrawing of carriage is required to prevent the carriage from being inserted or withdrawn while the circuit breaker is being closed.

Figure 1:
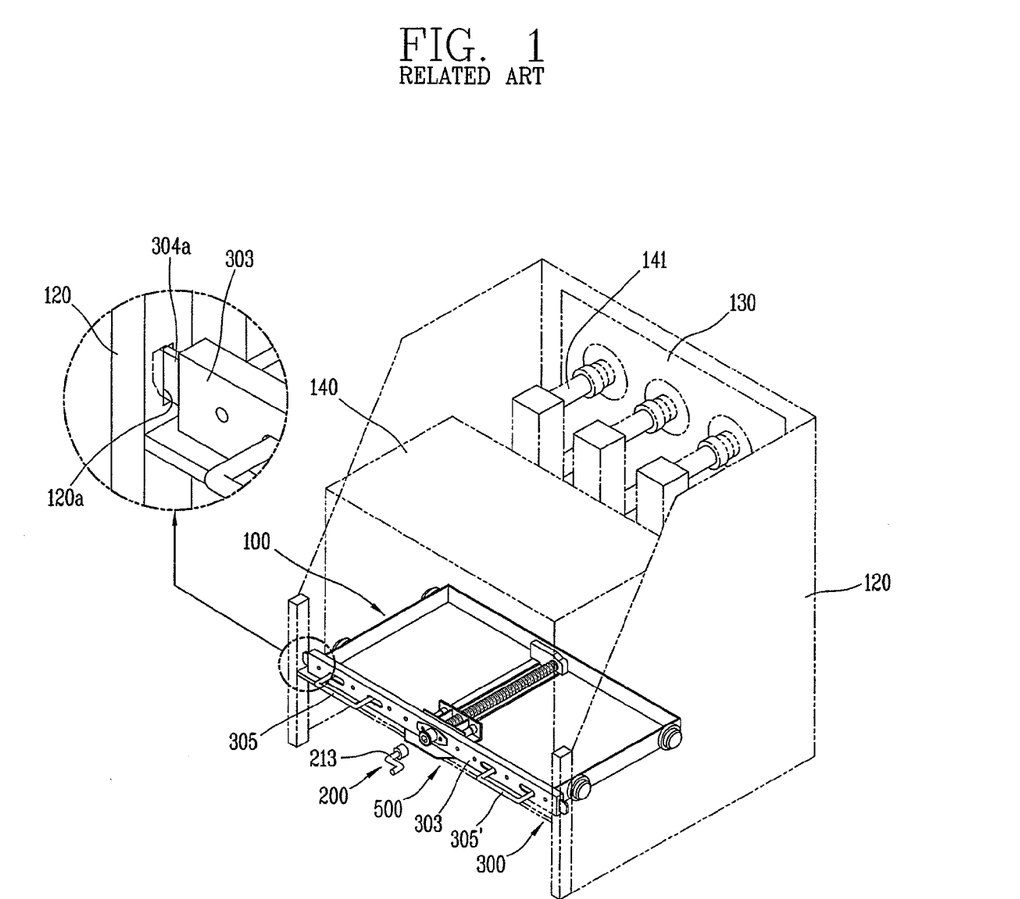
FIG. 1 is a side view schematically showing the related art circuit breaker.
Figure 2:
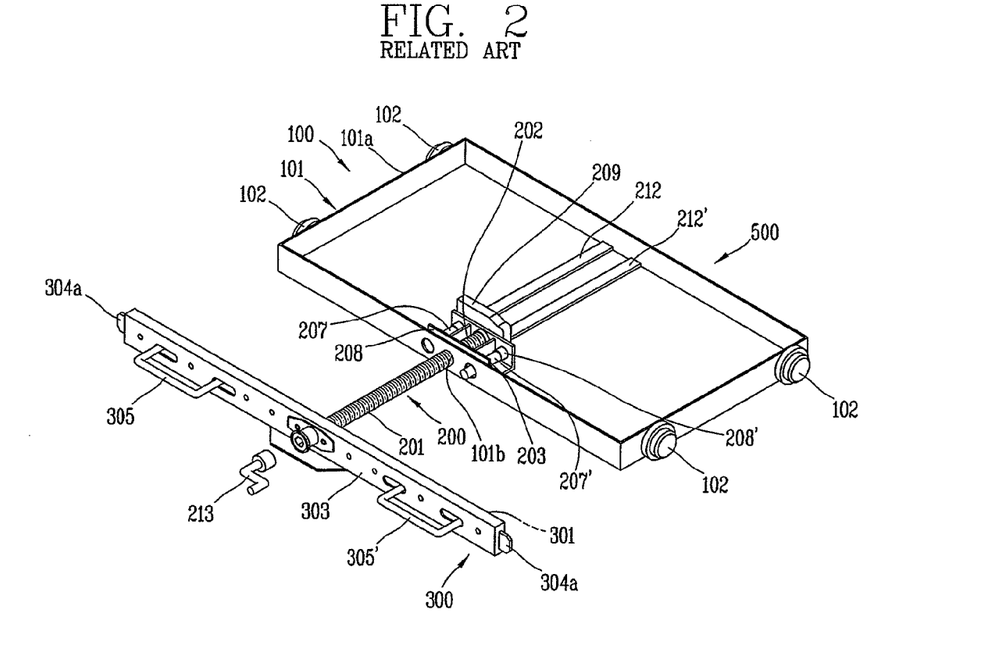
FIG. 2 is a plan view of a major part by partially cutting a carriage part of the circuit breaker according to FIG. 1.
Figure 3:
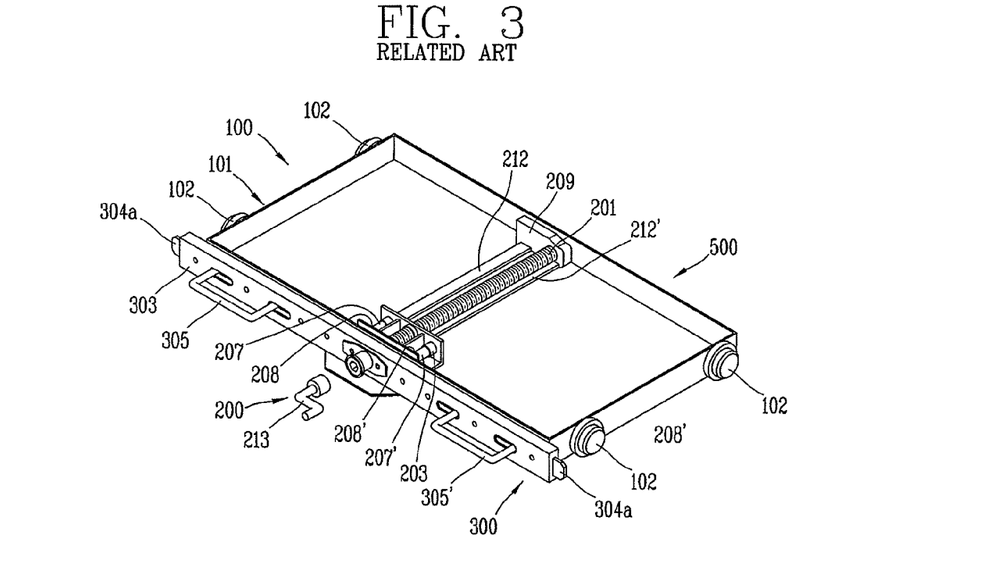
FIG. 3 is a schematic view showing a horizontal movement plate manipulation part constituting a device for preventing withdrawing and inserting of a carriage part of the circuit breaker according to FIG. 1.
Figure 4:
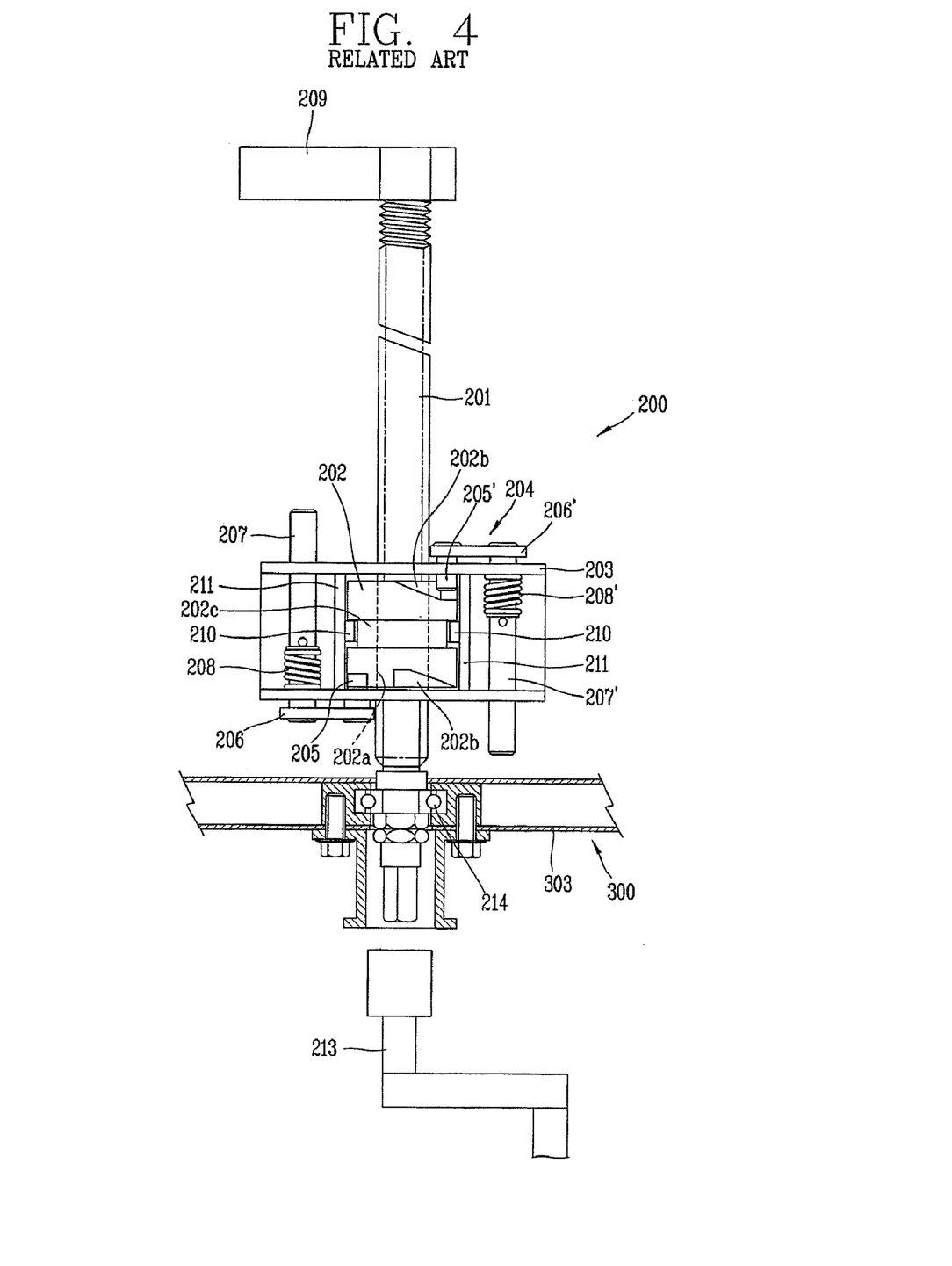
FIG. 4 is an enlarged schematic view of a lead screw and a clamping member according to FIG. 2.

FIG. 1 is a perspective view showing the configuration of the related art circuit breaker. FIGS. 2 and 3 are perspective views showing the related art device for transferring a breaker main body of a circuit breaker. FIG. 4 is a partial cross-sectional view showing the configuration of the related art device for transferring a circuit breaker.

As shown in FIG. 1, the related art device for transferring breaker main body of the circuit breaker includes a carriage 100 on which a breaker main body 140, which is coupled to or separated from a mounting frame 130 installed at a rear side of a cradle 120, is loaded, an withdrawal handle 200 for moving the carriage 100 forward and backward, a braking unit for limiting a transfer distance of the carriage 100 transferred by the withdrawal handle 200, and a girder assembly 300 for supporting the withdrawal handle 200.

The carriage 100 includes a box body 101 having an open upper side and including a wall body 101a formed with a certain height on an outer circumferential surface, and two wheels 102 installed at both sides of the box body 101 and drawn in or out along guide rails installed at an inner side of both side walls of the cradle 120.

As shown in FIGS. 2 to 4, the withdrawal handle 200 includes a lead screw 201 inserted in a forward/backward direction of a through hole 101b formed on a front wall body 101a of the box body 101, a transfer nut 202 installed at an inner side of the front wall body 101a of the box body 101 in a state of being screw-coupled with the lead screw 201, a channel-shaped bracket 203 fixed to the box body 101 to prevent the transfer nut 202 from being released, and a handle 213 detachably attached to a front end portion in order to rotate the lead screw 201 forward and backward.

The transfer nut 202 includes a female screw portion 202a coupled with an outer circumferential surface of the lead screw 201, a guide recesses 202b each having a different depth, are formed at each of upper and lower surfaces of the transfer nut 202, and a guide recess 202c is formed on an outer circumferential surface of the transfer nut 202.

A girder 209 fixed to a rear end portion of the lead screw 201 may move forwardly and backwardly without a movement on a pair of travel rails 212 and 212' installed in a lengthwise direction on an inner side of the box body 101 of the carriage 100.

The girder assembly 300 includes a post bar 303 having a space part 301 formed at an inner side thereof and bearing-supporting to transfer a rotational force to a front end portion of the lead screw 201 which has passed through a fixing hole formed at the center, a sliding plate (not shown) installed to be movable in a left and right direction at both inner sides of the post bar 303, left and right handles 305 and 305' fixed to the left and right sliding plates and installed to be protruded from an outer side of the post bar 303, and a positioning spring (not shown) for moving the left and right sliding plates to an outer side in order to insert an end portion 304a into position recess 120a formed on both wall bodies of the cradle 120.

A braking unit 204 is installed near the transfer nut 202, and when the rotation of the transfer nut 202 is limited, the braking unit 204 fixes a breaking basic body 140 loaded on the carriage 100 interworking with the transfer nut 202 at stopping and operational positions.

As shown in FIG. 4, the braking unit 204 is installed in a diagonal direction of a bracket 203 of the forward and reverse rotation preventing pins 205 and 205' so as to be inserted into or released from guide recesses 202b formed on the upper and lower surface of the transfer nut 202. The forward and reverse rotation preventing pins 202 and 205' are connected with connection plates 206 and 206' by means of left and right driving pins 207 and 207'. The left and right driving pins 207 and 207' are elastically supported by springs 208 and 208'. The left and right driving pins 207 and 207' are pressed to the side of the rudder 209 installed at an end portion of the lead screw and the side of the girder assembly 300 when the carriage 100 moves forward and backwards. Guide pins 210 for correctly positioning the transfer nut 202 when the forward rotation preventing pin 204 or the reverse rotation preventing pin 205' are released from the guide recesses 202b of the transfer nut 202 by the left and right driving pins 207 and 207' are installed at a pair of support plates 211 and 211' installed at certain interval in a vertical direction at the bracket 203 so as to be inserted into the guide recess 202c of the transfer nut 202.

Reference numeral 141 denotes an upper booth bar, 214 denotes a bearing, and 500 denotes a transfer device.

In the breaker including the device 500 for transferring the breaker main body of the related art circuit breaker configured as described above, in order to assemble the device, the carriage 100 is put on the cradle 120, the sliding plates are moved in an inward direction by using the left and right handles 305 and 305' of the girder assembly 300, and the girder assembly 300 is fixed so that the end portions 304a of the sliding plate can be inserted into the position recesses 120a.

In the state that the girder assembly 300 is fixed on the cradle 120, the carrier 100 is moved backwardly to couple the breaker main body 140 and the mounting frame 130 so as to be used, and during operation, current is led into an interruptor (no reference numeral given) installed at the inner side of the breaker main body 140 through the upper booth bar 141. The led-in current is drawn out through a lower booth bar (not shown), and in this operational state, when an accident occurs, the interruptor instantaneously interrupts current.

In the state that the interruptor interrupts current, the breaker main body 140 is disassembled from the mounting frame 130. To this end, in a state that the breaker main body 140 is coupled with the mounting frame 130, an operator may couple the withdrawal handle 213 to a front end of the lead screw 201 and rotate the lead screw 201 counterclockwise. Then, the bracket 203 and the carriage 100 are moved by the transfer nut 202, and the breaker main body 140 is moved forward to disassemble the breaker main body 140 from the mounting frame 130.

In the state that the breaker main body 140 is disassembled from the mounting frame 130, a repairing operation is performed. Thereafter, when the breaker main body 140 is coupled to the mounting frame 130, the operator rotates the lead screw 201 clockwise by using the withdrawal handle 213. Then, the carriage 100 is moved backward and the breaker main body 140 is coupled to the mounting frame 130.

The rotation of the transfer nut 202 moving in the forward and backward direction at the lead screw 201 is limited by the braking unit 204. When the carriage 100 is not completely moved to the front side, namely, in case of a non-operational state, the right driving pin 207' is brought into contact with one side of the girder assembly 300, the reverse rotation preventing pin 205' is released from the guide recess 202b of the transfer nut 202, idly rotating, and thus, the carrier 100 cannot move any longer.

When the carriage 100 is in a state of being completely moved to the rear side, namely, in case of the operational state, the transfer nut 202 is completely moved to the rear side along the lead screw 201, so the left driving pin 207 is brought into contact with the side of the rudder 209 installed at the rear end portion of the lead screw 201, the forward rotation preventing pin 205 is released from the guide recess 202b of the transfer nut 202, making the transfer nut 202, idly rotated, so the transfer nut 202 does not move any longer.

In the related art circuit breaker, even in an unstable state that each the end portion 304a of the sliding plates is respectively not inserted into the position recesses 120a, the withdrawal handle 200 may be inserted into the girder assembly 300 so as to operate, so a problem arises in that an abnormal withdrawing and inserting operation may be performed.

SUMMARY OF THE INVENTION

Therefore, in order to address the above matters, the various features described herein have been conceived.

An aspect of the present invention provides a device for preventing withdrawing and inserting of a circuit breaker capable of preventing the occurrence of an abnormal withdrawing and inserting operation by preventing a withdrawal handle from being inserted into a girder assembly and thus not being operated in an unstable state in which each the end portion of the sliding plates is not inserted in a position recess.

According to an aspect of the present invention, there is provided a device for preventing withdrawing and inserting of a circuit breaker including: a cradle; a carriage on which circuit breaker electrically connected to the cradle or separated from the cradle; a girder assembly selectively fixed to the cradle; a lead screw coupled between the carriage and the girder assembly and rotated by an external force to allow the carriage to move over the cradle to close a breaker main body or release it; and a braking unit provided at the girder assembly and preventing the lead screw not to operate when the girder assembly is released from the cradle.

The foregoing and other objects, features, aspects and advantages of the present invention will become more apparent from the following detailed description of the present invention when taken in conjunction with the accompanying drawings.

DETAILED DESCRIPTION OF THE INVENTION

A device for preventing withdrawing and inserting of a circuit breaker according to an exemplary embodiment of the present invention will now be described with reference to the accompanying drawings.

Figure 5:
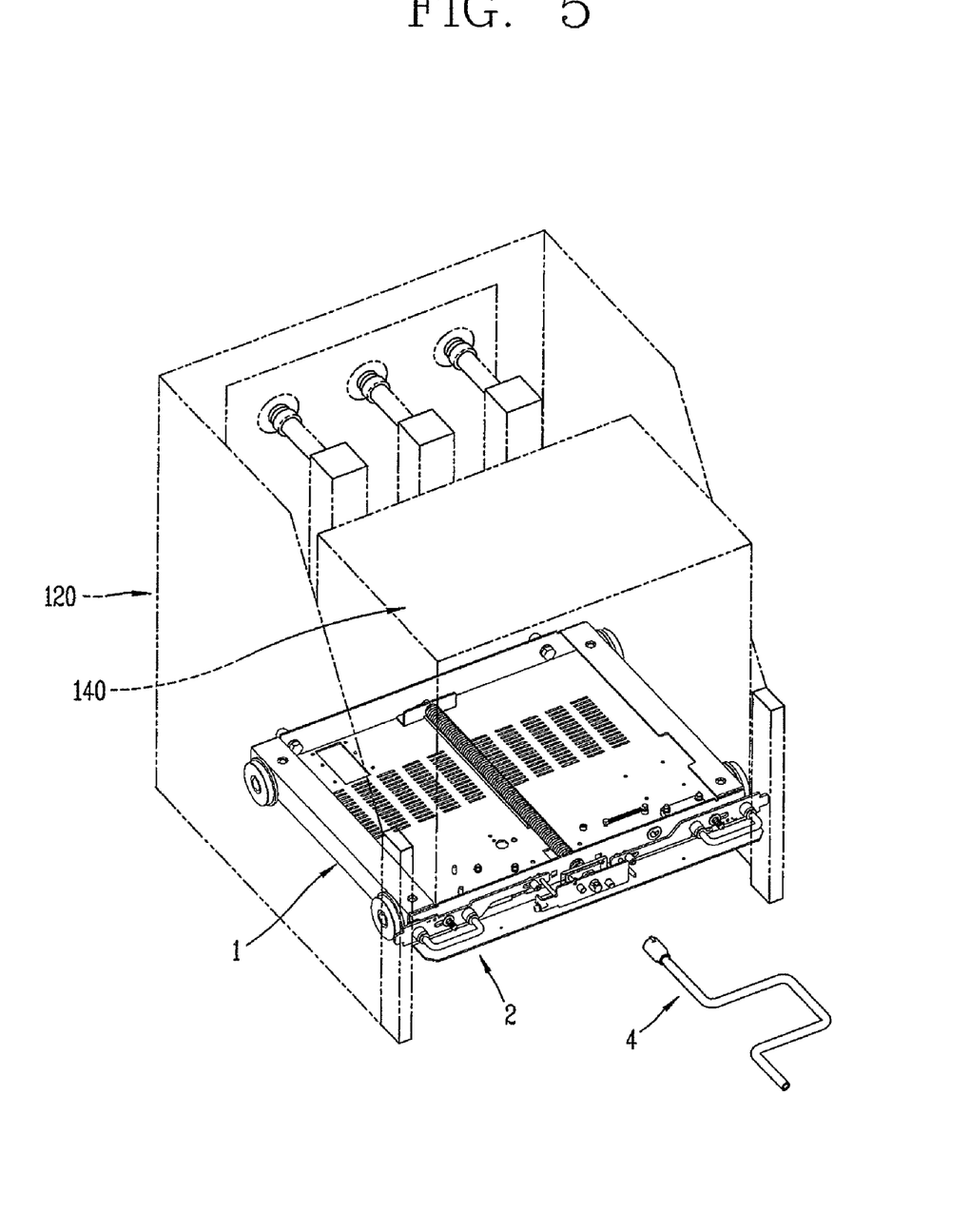
FIG. 5 is a schematic view showing a circuit breaker according to an exemplary embodiment of the present invention.
Figure 6:
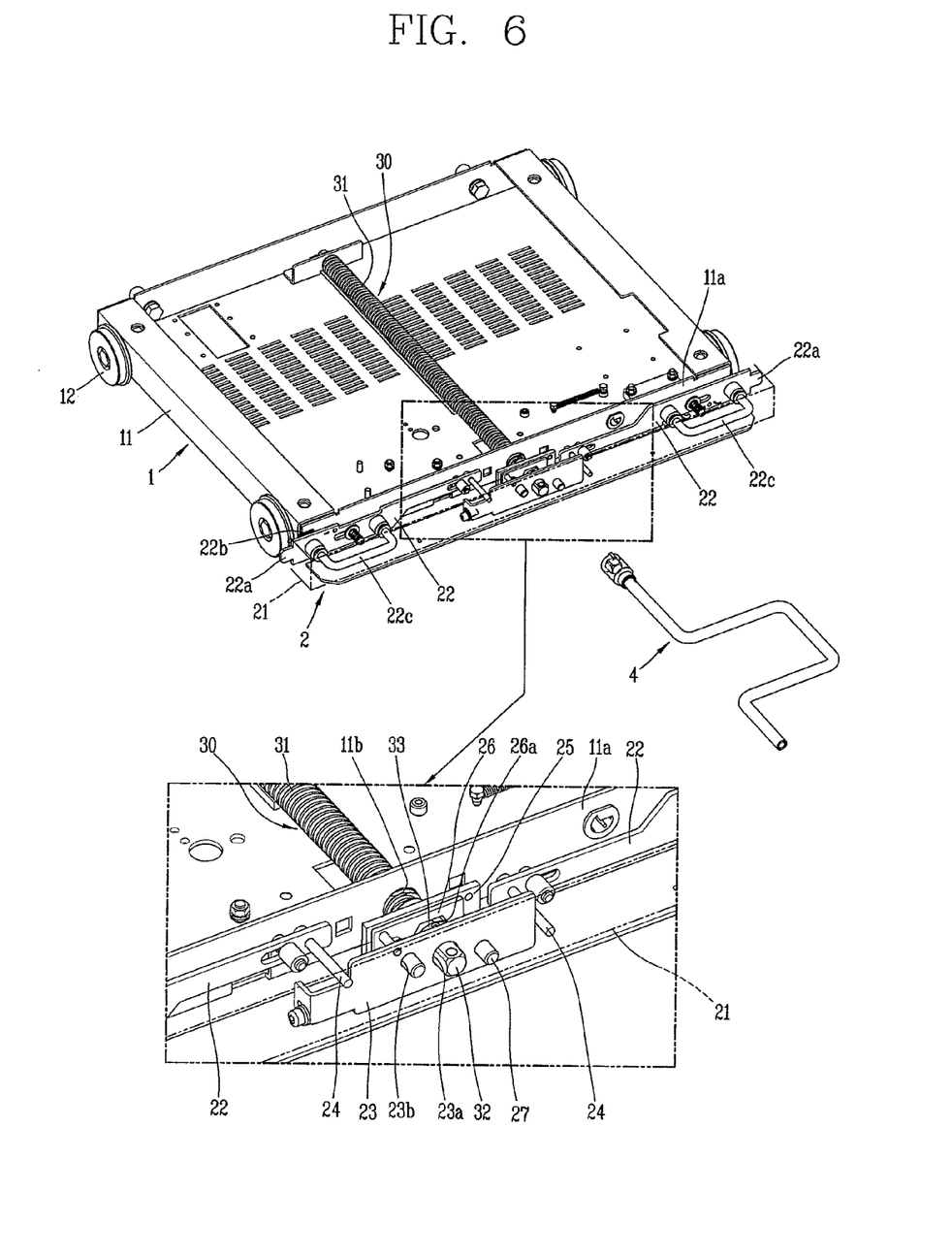
FIGS. 6 and 7 are a perspective view and a plan view showing a carriage and a girder assembly of the circuit breaker according to FIG. 5.
Figure 7:
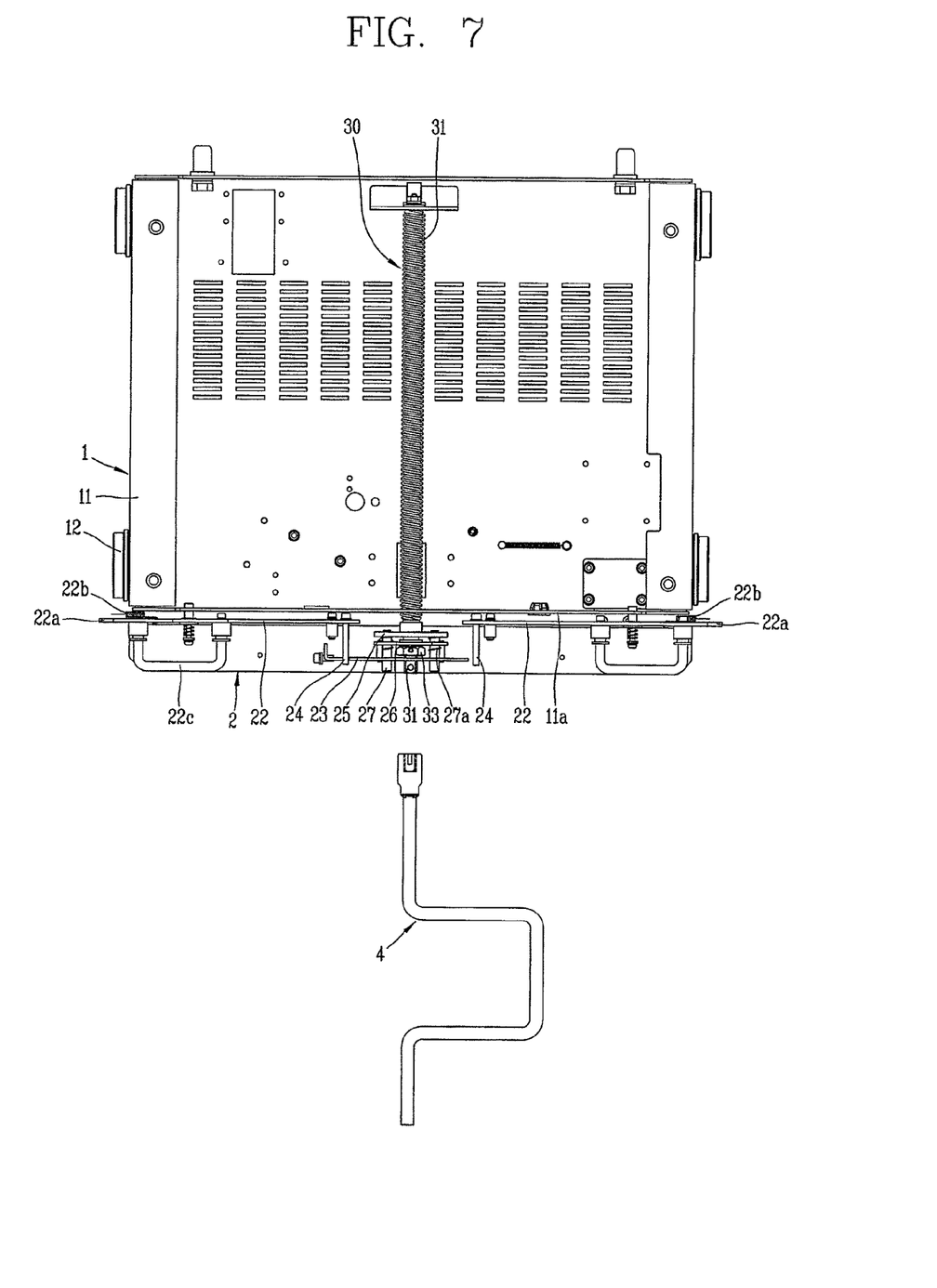
Figure 8:
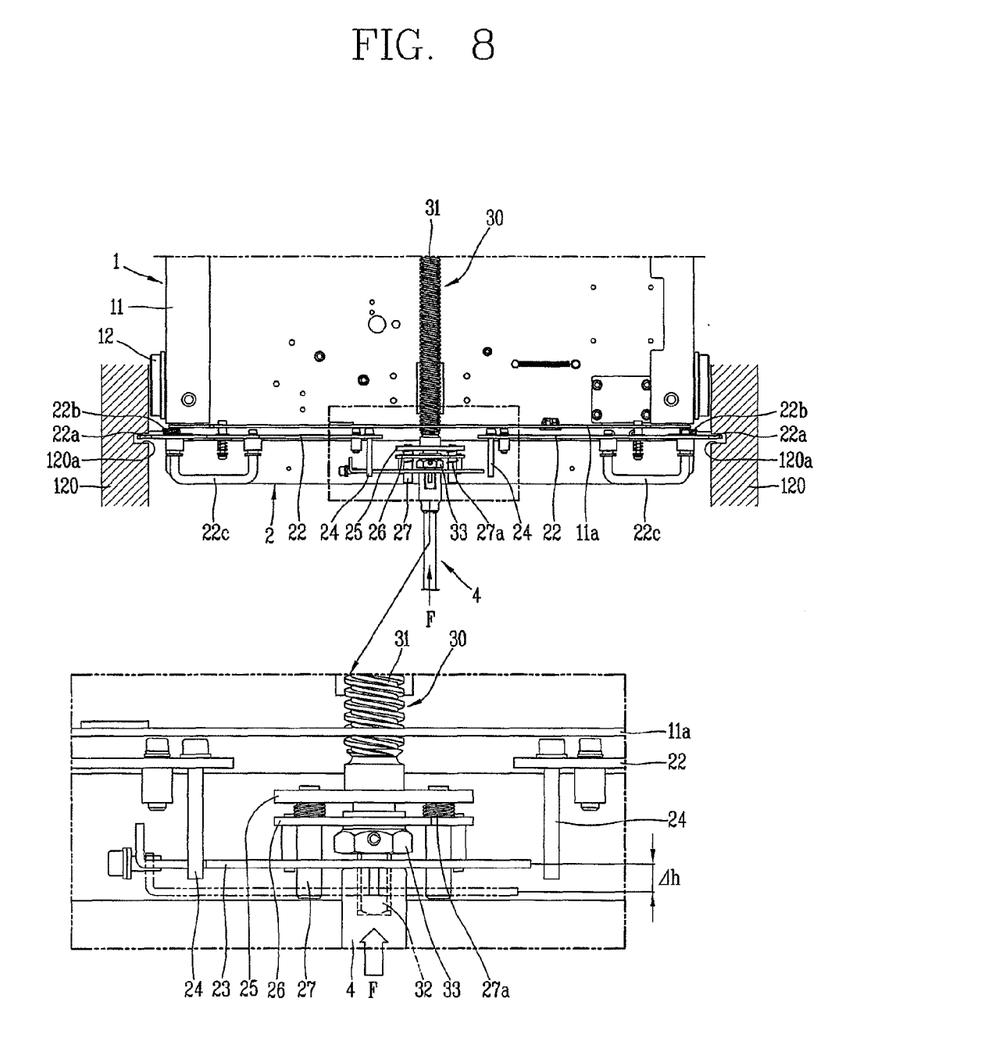
FIG. 8 is a plan view for explaining a state in which the girder assembly is restrained on the cradle, namely, a normal state.
Figure 9:
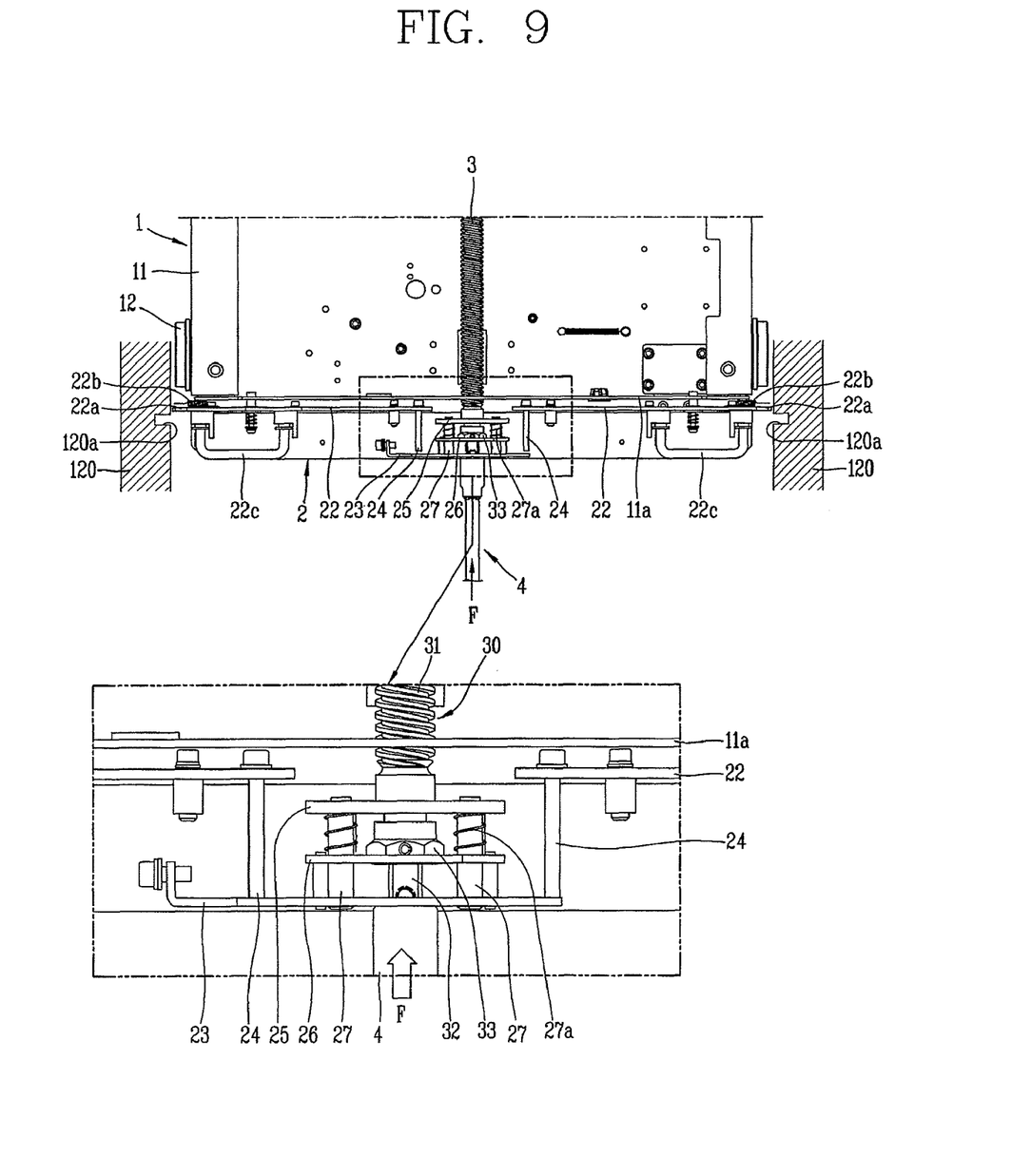
FIG. 9 is a plan view for explaining a state in which the girder assembly is not restrained on the cradle, namely, in an abnormal state.

FIG. 5 is a schematic view showing a circuit breaker according to an exemplary embodiment of the present invention. FIGS. 6 and 7 are a perspective view and a plan view showing a carriage and a girder assembly of the circuit breaker according to FIG. 5. FIG. 8 is a plan view for explaining a state in which the girder assembly is restrained on the cradle, namely, a normal state. FIG. 9 is a plan view for explaining a state in which the girder assembly is not restrained on the cradle, namely, in an abnormal state.

As shown in FIG. 5, a circuit breaker having a device for preventing withdrawing and inserting according to an exemplary embodiment of the present invention includes a cradle 1 in a distributing board in which various electric devices including a circuit breaker are disposed and managed to operate or control a power station and a transformer substation or operate an electromotor, and the like. A breaker main body 140 is loaded on a carriage 1 selectively coupled to the cradle 120 and detachably received.

As shown in FIG. 6, the carriage 1 is disposed to move in a forward and backward direction with respect to a girder assembly 2 selectively coupled with a lower end portion of the cradle 120, and both ends of a lead screw 3 that varies the space between the carriage 1 and the girder assembly 2 are coupled between the carriage 1 and the girder assembly 2. Namely, the carriage 1 loading the breaker main body 140 thereon moves in a direction in which the carriage 1 approaches the girder assembly 2 or in a direction in which the carriage 1 becomes away from the girder assembly 2 according to a rotational direction of the lead screw 3.

As shown in FIGS. 6 and 7, the carriage 1 includes a box body 11, whose upper side is open, having a wall body with a certain height on an outer circumferential surface thereof, and two wheels 12 installed at both sides of the box body 101 and drawn in or out along guide rails installed at an inner side of both side walls of the cradle 120.

A withdrawal hole 11b is formed at the center of a front surface, namely, a face 11a facing the girder assembly, in order to allow the box body 11 in mesh with a rotation transfer unit 31 of the lead screw 3 to move in a forward and backward direction along the rotational direction of the lead screw.

The girder assembly 2 includes a girder housing 21 formed to be lengthy in a rectangular shape, a plurality of first members (referred to as 'sliding plates', hereinafter) 22 slidably disposed in a horizontal direction at both sides of the lead screw 2 with a certain height at the rear side of the girder housing 21, namely, at the side facing the carriage 1, a second member (referred to as a 'blocking plate', hereinafter) 23 positioned between the sliding plates 22, and a plurality of third members (referred to as 'interlock bolts', hereinafter) 24 fastened to corresponding ends of the sliding plates 22 and protruded in the direction of the blocking plates 23.

A position protrusion 22a is formed to be protruded at an outer end of the sliding plate 22 such that it can be inserted into a position recess 120a of the cradle 120. A positioning sprig 22b is installed at one side of the sliding plate, namely, at the side facing the carriage 1, in order to pull each sliding plate 22 toward a side wall of the cradle 120. A handle 22c is formed at the other side of the sliding plate 22 in order to inwardly pulling the sliding plate 22 when the sliding plate 22 is separated from the cradle 120.

The blocking plate 23 is formed to be shorter than the length of the sliding plate 22, and a screw hole 23a is formed at the center such that a pressing protrusion 32 of the lead screw 3 pass therethrough so as to be exposed when the blocking plate 23 is pushed to the rear side. Pin holes 23b are formed at both sides of the screw hole 23a in a horizontal direction to allow a guide pin 27 to pass therethrough.

Meanwhile, the girder assembly 2 further includes a guiding part for guiding the blocking plate 23 to move in a forward and backward direction. The guiding part includes a first plate (referred to as a 'fixed plate', hereinafter) fixed to the girder assembly 2, a second plate (referred to as a 'moving plate', hereinafter) provided between the fixed plate 25 and the blocking plate 23, maintaining a certain interval with the blocking plate, and elastically supported by the fixed plate 25, and a guide pin 27 fixed to the fixed plate 25 and slidably coupled to the blocking plate 23. A blocking spring 27a is installed on an outer circumferential surface of the guide pin 27, namely, between the fixed plate 25 and the moving plate 26 in order to elastically support the moving plate 26 with respect to the fixed plate 25 and enabling the blocking plate 23 to maintain a blocking position.

A rotation preventing recess 26a is formed at the center of the moving plate 26 such that it is selectively engaged with a rotation preventing protrusion 33 provided at the lead screw 3. The rotation preventing recess 26a may have a substantially same shape as that of the rotation preventing protrusion 33, namely, an angular shape, e.g., a hexahedral shape, in order to prevent the lead screw 3 from being rotated when the blocking plate 23 is at a restrained position, to thus restrain the movement of the carriage 1.

Reference numeral 4 denotes a withdrawal handle.

In the circuit breaker according to an exemplary embodiment of the present invention, the process of inserting the breaker body toward the cradle by an operator in a state that the breaker main body is withdrawn, namely, in a state that the carriage is tightly attached with the girder assembly is shown in FIG. 8.

First, the operator moves the carriage 1 and the girder assembly 2 to an insertion preparation position. And then, the operator inwardly pulls the both handles 22c provided at the sliding plate 22 of the girder assembly 2 to enable the sliding plate 22, overcoming the position sprig 22b, to gather inwardly. When the handles 22c are released in a state that the position protrusion 22a provided at an outer side of the sliding plate 22 is at a position corresponding to the position recess 120a of the cradle 120, the positioning sprig 22b is restored and the position protrusion 22a of the sliding plate 22 is insertedly coupled in the position recess 120a. Then, the interlock bolt 24 provided at the sliding plate 22 reaches a position at an outer side of the blocking plate 23, namely, at an outer side of the range of the blocking plate 23.

Next, in order to move the breaker main body 140 to an insertion position in a state that it is withdrawn from the cradle 120, the operator must push the carriage 1 toward the cradle 120 from the girder assembly 2 by using the withdrawal handle 4. To this end, as shown in FIG. 8, the withdrawal handle 4 is put on the blocking plate 23 and presses by applying an external force (F) in the direction of an arrow. Then, because the interlock bolts 24 are positioned at the outer side of the blocking plate 23, the blocking plate 23 is pushed toward the cradle 120, namely, toward the rear side by a certain depth (Δh), and the moving plate 26 coupled with the blocking assembly is pushed to the rear side along with the blocking plate 23. Then, the rotation preventing recess 26a of the moving plate 26 is released from the rotation preventing protrusion 33 of the lead screw 3, making the lead screw 3 free.

Next, when the operator inserts the withdrawal handle 4 to the pressing protrusion 32 of the lead screw 3 and rotates it, the carriage 1 engaged with the rotation transfer unit 31 of the lead screw 3 is pushed toward the cradle 120, thus completing the inserting operation.

Meanwhile, as shown in FIG. 9, in a state that the girder assembly 2 is not coupled to the cradle 120, namely in a state that the position protrusion 22a of the sliding plate 22 is not inserted in the position recess 120a of the cradle 120, the interlock bolt 24 is positioned within the range of the blocking plate 23. Thus, in this state, even if the operator pushes the blocking plate 23 with the withdrawal handle 4 in the direction of the arrow by applying the external force (F) thereto, the blocking plate 23, caught by the interlock bolt 24, is not pushed toward the rear side, so the pressing protrusion 32 of the lead screw 3 is not exposed from the blocking plate 23. Accordingly, the operator cannot couple the withdrawal handle to the pressing protrusion 32 of the lead screw 2, and thus, the lead screw 3 cannot be rotated.

Therefore, because the carriage cannot be moved in a state that the girder assembly is not coupled with the cradle, various safety accidents, a contact resistance and temperature rise, damage to a device due to electrical breakdown can be prevented.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A device for preventing withdrawing and inserting of a circuit breaker, the device comprising:
    a cradle;
    a carriage on which circuit breaker electrically connected to the cradle or separated from the cradle;
    a girder assembly selectively fixed to the cradle;
    a lead screw coupled between the carriage and the girder assembly and rotated by an external force to allow the carriage to move over the cradle to close a breaker main body or release it; and
    a braking unit provided at the girder assembly and preventing the lead screw from operating when the girder assembly is released from the cradle.

2. The device of claim 1, wherein the braking unit comprises:
    a plurality of first members provided to be moved in a first direction in which the girder assembly is fixed to the cradle or released therefrom;
    a second member provided to be separated by a certain distance with respect to the first member and moved in a second direction perpendicular to the first direction; and
    a third member allowing an external force to be transferred to the lead screw while the second member is moving when the first member is fixed to the cradle, and restraining such that the external force cannot act on the lead screw when the first member is released from the cradle.

3. The device of claim 2, wherein the third member is coupled to be protruded by a certain height from the first member or the second member, so that the second member or the first member, the counterparts, is caught by an end of the third member to thus be restrained from their movement.

4. The device of claim 2, wherein an elastic member is installed between the first member and the cradle such that the first member is pulled into the side of the cradle.

5. The device of claim 4, wherein a position recess is formed on the cradle and each a position protrusion is formed to be protruded from an end of an outer side of the first members so as to be inserted into the position recess of the cradle, respectively.

6. The device of claim 4, wherein each a handle for closely pulling the first member is formed at the first member when the first member is separated from the cradle.

7. The device of claim 2, wherein the second member is formed to be shorter than the first member.

8. The device of claim 7, wherein the second member includes a screw hole to allow the lead screw to pass therethrough so as to be exposed.

9. The device of claim 2, wherein the girder assembly includes a guiding part to allow the second member to move in the second direction.

10. The device of claim 9, wherein the guiding part comprises:
    a first plate fixed to the girder assembly; and
    a guiding pin fixed to the first plate and slidably coupled to the second member in the second direction.

11. The device of claim 10, wherein a screw hole is formed at the second member to allow the lead screw to pass therethrough so as to be exposed, and pin holes are formed at both sides of the screw hole to allow the guide pin to be slidably inserted thereinto.

12. The device of claim 10, wherein a second plate is provided between the first plate and the second member to maintain a certain space with the second member.

13. The device of claim 12, wherein the second plate is elastically supported by the first plate by means of a spring inserted into the guide pin.

14. The device of claim 12, wherein the second plate comprises a rotation preventing recess to prevent the lead screw from being rotated.

* * * * *